US008448217B2

(12) United States Patent
Tokutani et al.

(10) Patent No.: US 8,448,217 B2
(45) Date of Patent: May 21, 2013

(54) COMPUTER PROGRAM, METHOD, AND SYSTEM FOR ACCESS CONTROL

(75) Inventors: Takashi Tokutani, Kawasaki (JP); Takahisa Hatakeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1355 days.

(21) Appl. No.: 11/897,187

(22) Filed: Aug. 29, 2007

(65) Prior Publication Data

US 2008/0104663 A1    May 1, 2008

(30) Foreign Application Priority Data

Nov. 1, 2006   (JP) ................................. 2006-297291

(51) Int. Cl.
*H04L 29/06* (2006.01)
*G06F 17/00* (2006.01)
*G06F 15/173* (2006.01)

(52) U.S. Cl.
USPC .............................................. 726/1; 709/225

(58) Field of Classification Search
None
See application file for complete search history.

(56) References Cited

U.S. PATENT DOCUMENTS

| 6,141,754 | A * | 10/2000 | Choy ................................. 726/1 |
| 7,630,984 | B2 | 12/2009 | Qi |
| 2002/0095565 | A1* | 7/2002 | Nemirovsky et al. .......... 712/228 |
| 2005/0187877 | A1* | 8/2005 | Tadayon et al. .................. 705/51 |
| 2006/0136390 | A1* | 6/2006 | Zhao et al. ......................... 707/3 |
| 2006/0173810 | A1* | 8/2006 | Hom et al. ......................... 707/2 |
| 2006/0212924 | A1* | 9/2006 | Xie et al. ........................... 726/1 |
| 2007/0056018 | A1* | 3/2007 | Ridlon et al. ...................... 726/1 |
| 2007/0143855 | A1* | 6/2007 | Gilchrist et al. ................. 726/26 |
| 2008/0066147 | A1* | 3/2008 | Dillaway et al. .................. 726/1 |
| 2008/0215509 | A1* | 9/2008 | Charlton ........................ 706/11 |

FOREIGN PATENT DOCUMENTS

| JP | 2003-281149 | | 10/2003 |
| JP | 2005-55998 | A | 3/2005 |
| JP | 2005-339506 | A | 12/2005 |
| JP | 2006-40247 | A | 2/2006 |
| JP | 2006-155104 | A | 6/2006 |

OTHER PUBLICATIONS

"Japanese Office Action" mailed by JPO and corresponding to Japanese application No. 2006-297291 on Jul. 26, 2011, with partial English translation.

* cited by examiner

*Primary Examiner* — Nathan Flynn
*Assistant Examiner* — Trang Doan
(74) *Attorney, Agent, or Firm* — Fujitsu Patent Center

(57) ABSTRACT

A computer program, method, and system for access control, which are capable of keeping and guaranteeing consistency of access control settings. A collector collects access control information and resource information which are set for each unit of processing such as an application and a file system and are transmitted from a transmitter, and stores them in an access control information memory. A combiner combines the collected access control information to create and store combined access control information in a combined access control information memory. A consistency adjuster analyzes the policies defined in the combined access control information stored in the combined access control information memory to detect inconsistency, and if inconsistency is detected, resolves the inconsistency according to an inconsistency measure policy. Thus, consistent filtering master information for the entire system is created and stored in a filtering master information memory.

18 Claims, 17 Drawing Sheets

| USER/GROUP | RESOURCE | OPERATION | PERMISSION | DENIAL | VALID PERIOD | | DEVICE |
|---|---|---|---|---|---|---|---|
| | | | | | START | END | |
| 00000001 | yyy1.xls | RW | 1 | 0 | 2005/4/1 | - | xxx1 |
| 00000001 | xxx1.db | RW | 0 | 1 | 2005/4/1 | 2005/8/2 | xxx2 |
| 00000003 | xxx2.db | RW | 1 | 0 | 2006/7/30 | 2008/8/20 | xxx3 |
| 00000002 | xxxx.doc | W | 1 | 0 | - | - | xxx1 |

FIG. 4A

| USER/GROUP | RESOURCE | OPERATION | PERMISSION | DENIAL | VALID PERIOD | | DEVICE |
|---|---|---|---|---|---|---|---|
| | | | | | START | END | |
| 00000001 | DB1 | insert | 1 | 0 | 2005/4/1 | - | xxx1 |
| 00000001 | DB3 | delete | 0 | 1 | 2005/4/1 | 2005/8/2 | xxx2 |
| 00000003 | DB2 | update | 0 | 1 | 2006/7/30 | 2008/8/20 | xxx3 |
| 00000002 | DB4 | select | 1 | 0 | - | - | xxx1 |

| | | | OS-SPECIFIC IDENTIFIER NAME |
|---|---|---|---|
| C | hoge | xxx | a1.doc |
| | | | a2.doc |
| | DB | Data | xxx1.db |
| | | | xxx2.db |
| | | | |

| OS-SPECIFIC IDENTIFIER NAME | DB-SPECIFIC IDENTIFIER NAME | TABLE NAME |
|---|---|---|
| xxx1.db | DB1 | Atable1 |
| | | Atable2 |
| | | Atable3 |
| xxx2.db | DB2 | Btable1 |
| | | Btable2 |
| | | Btable3 |
| | | |

FIG. 5B

121 RESOURCE INCLUSION RELATION INFORMATION

| NUMBER | RESOURCE | PARENT RESOURCE |
|---|---|---|
| 1 | xxx1.db | – |
| 2 | DB1 | 1 |
| 3 | Atable1 | 2 |
| 4 | Atable2 | 2 |
| 5 | Atable2 | 2 |
| 6 | xxx2.db | – |
| 7 | DB2 | 6 |
| 8 | Btable1 | 7 |
| 9 | Btable2 | 7 |
| 10 | Btable3 | 7 |
| ⋮ | ⋮ | ⋮ |

FIG. 7

122 COMBINED ACCESS CONTROL INFORMATION

| PRO HASH VALUE 122a | COLLISION ID 122b | SUBJECT (GLOBAL ID) 122c | RESOURCE 122d | OPERA-TION 122e | PER-MISSION 122f | DENIAL 122g | POLICY INFORMATION 122h | REFERENCE QUANTITY 122i |
|---|---|---|---|---|---|---|---|---|
| HASH 1 | 00000001 | 00000001 | yyy1.xls | RW | 1 | 0 | OS | 1121 |
| HASH 2 | 00000000 | 00000001 | xxx1.db | RW | 0 | 1 | OS | 110 |
| HASH 3 | 00000000 | 00000001 | DB1 | insert | 1 | 0 | DB | 1080 |
| HASH 1 | 00000002 | 00000001 | DB3 | delete | 0 | 1 | DB | 876 |
| HASH 4 | 00000000 | 00000003 | xxx2.db | RW | 1 | 0 | OS | 1103 |
| HASH 5 | 00000000 | 00000003 | DB2 | update | 0 | 1 | DB | 322 |
| HASH 6 | 00000000 | 00000002 | xxxx.doc | W | 1 | 0 | OS | 432 |
| HASH 2 | 00000001 | 00000002 | DB4 | select | 1 | 0 | DB | 102 |
|  |  |  |  |  |  |  |  |  |

FIG. 8

125 COMBINED ACCESS CONTROL INFORMATION

| | | | | | | |
|---|---|---|---|---|---|---|
| HASH 1 | 00000001 | yyy1.xls | RW | 1 | 0 | OS | 1121 |
| HASH 2 | 00000000 | xxx1.db | RW | 0 | 1 | OS | 110 |
| HASH 1 | 00000002 | DB3 | delete | 0 | 1 | DB | 876 |

FIG. 11A

126 COMBINED ACCESS CONTROL INFORMATION

| | | | | | | |
|---|---|---|---|---|---|---|
| HASH 1 | 00000001 | yyy1.xls | RW | 1 | 0 | OS | 1121 |
| HASH 3 | 00000001 | DB1 | insert | 1 | 0 | DB | 1080 |
| HASH 1 | 00000002 | DB3 | delete | 0 | 1 | DB | 876 |

FIG. 11B

127 COMBINED ACCESS CONTROL INFORMATION

| | | | | | | |
|---|---|---|---|---|---|---|
| HASH 1 | 00000001 | yyy1.xls | RW | 1 | 0 | OS | 1121 |
| HASH 2 | 00000000 | xxx1.db | RW | 0 | 1 | OS | 110 |
| HASH 1 | 00000002 | DB3 | delete | 0 | 1 | DB | 876 |

FIG. 11C

COMPUTER PROGRAM, METHOD, AND SYSTEM FOR ACCESS CONTROL

CROSS-REFERENCE TO RELATED APPLICATIONS

This application is based upon and claims the benefits of priority from the prior Japanese Patent Application No. 2006-297291, filed on Nov. 1, 2006, the entire contents of which are incorporated herein by reference.

BACKGROUND OF THE INVENTION (1) Field of the Invention

This invention relates to a computer program, method, and system for access control, and more particularly to a computer program, method, and system for performing access control to resources in accordance with preset access control information prescribing the access control.

(2) Description of the Related Art

In computer systems, an access control function is a most basic security function that is provided at various levels including Virtual Machine (VM), Operating System (OS), Middle Ware (MW), and application. The access control function determines based on preset access control policies whether to permit or deny accesses to resources, the access control policies specifying "who are allowed to use which resources and what privileges they have".

FIG. 17 shows conventional setting of access control policies.

An administrator A 901 is authorized to set access control policies for an application A 911, and sets an access control policy 931 specifying that "Taro is allowed to access", which applies to a user "Taro" 903 who will use the application A 911. An administrator B 902 is authorized to set access control policies for an application B 912, and sets an access control policy 932 specifying that "Taro is not allowed to access", which applies to the user "Taro" 903 who will use the application B 912.

In this way, an access control policy can be set for each unit of processing for which an access control function is executed.

By the way, for some applications, more specific access rights, for example, according to the hierarchical structure of a structural document may be required. Therefore, there is proposed an access right setting method for easily setting specific access rights, with respect to not only the structural elements of a structural document but also display styles or purposes (for example, Japanese Unexamined Patent Publication No. 2003-281149 (FIG. 1)).

With the conventional access control method, specific access rights can be set at different levels. However, this method has a drawback that administrators individually set access control policies and this causes inconsistency in access rights to resources.

Referring to FIG. 17, consider a case where the user "Taro" 903 accesses a resource X 920. The access control policy 931 set by the administrator A 901 allows the user "Taro" 903 to access the resource X 920. The access control policy 932 set by the administrator B 902 does not allows the user "Taro" 903 to access the resource X 920. That is to say, the user Taro" 903 cannot access the resource X 920 via the application B 912, but can access the resource X 920 via the application A 911. Such inconsistency of the access control policies may produce a big risk in the system.

Therefore, for system security, what is crucial is consistency of access control policies in an entire system.

SUMMARY OF THE INVENTION

This invention has been made in view of the foregoing and intends to provide a computer program, method, and system for access control which are capable of keeping and guaranteeing consistency of access control policies.

To accomplish the above object, there is proposed an access control program for performing access control to resources based on preset access control information prescribing the access control. This access control program causes a computer to function as: a collector that collects the access control information and resource information on the resources, which are set for each unit of processing that executes prescribed processes and are stored in a memory unit of the unit of processing, and stores the access control information and the resource information in an access control information memory; a combiner that combines the access control information stored in the access control information memory to create combined access control information; and a consistency adjuster that analyzes the combined access control information to determine based on the resource information whether access control settings specifying an identical subject and an identical objective resource are inconsistent, and if inconsistency is detected, corrects the inconsistent access control settings in accordance with an inconsistency measure policy to make the combined access control information consistent, and stores the consistent combined access control information in a filtering master information memory as filtering master information, the access control settings being defined in the combined access control information, the inconsistency measure policy describing measures against the inconsistency.

Further, to accomplish the above object, there is proposed an access control method for performing access control to resources based on preset access control information prescribing the access control. This access control method comprises the steps of: collecting the access control information and resource information on the resources, which are set for each unit of processing that executes prescribed processes and are stored in a memory unit of the unit of processing, and storing the access control information and the resource information in an access control information memory; combining the access control information stored in the access control information memory to create combined access control information; and analyzing the combined access control information to determine based on the resource information whether access control settings specifying an identical subject and an identical objective resource are inconsistent, and if inconsistency is detected, correcting the inconsistent access control settings in accordance with an inconsistency measure policy to make the combined access control information consistent, and storing the consistent combined access control information in a filtering master information memory as filtering master information, the access control settings being defined in the combined access control information, the inconsistency measure policy describing measures against the inconsistency.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4A and 4B show examples of access control information that is collected by an administration server according to the embodiment of this invention.

FIGS. 5A and 5B show examples of resource information that is collected by the administration server according to the embodiment of this invention.

FIG. 7 shows an example of resource inclusion relation information that is created by a combiner according to the embodiment of this invention.

FIG. 8 shows an example of combined access control information that is created by the combiner according to the embodiment of this invention.

FIGS. 11A, 11B, and 11C show examples of an adjusting process to be performed by the consistency adjuster according to the embodiment of this invention.

DESCRIPTION OF THE PREFERRED EMBODIMENTS

A preferred embodiment of this invention will be described with reference to the accompanying drawings. The invention that is implemented in the embodiment will be outlined first, and then the embodiment will be specifically described.

Figure 1:
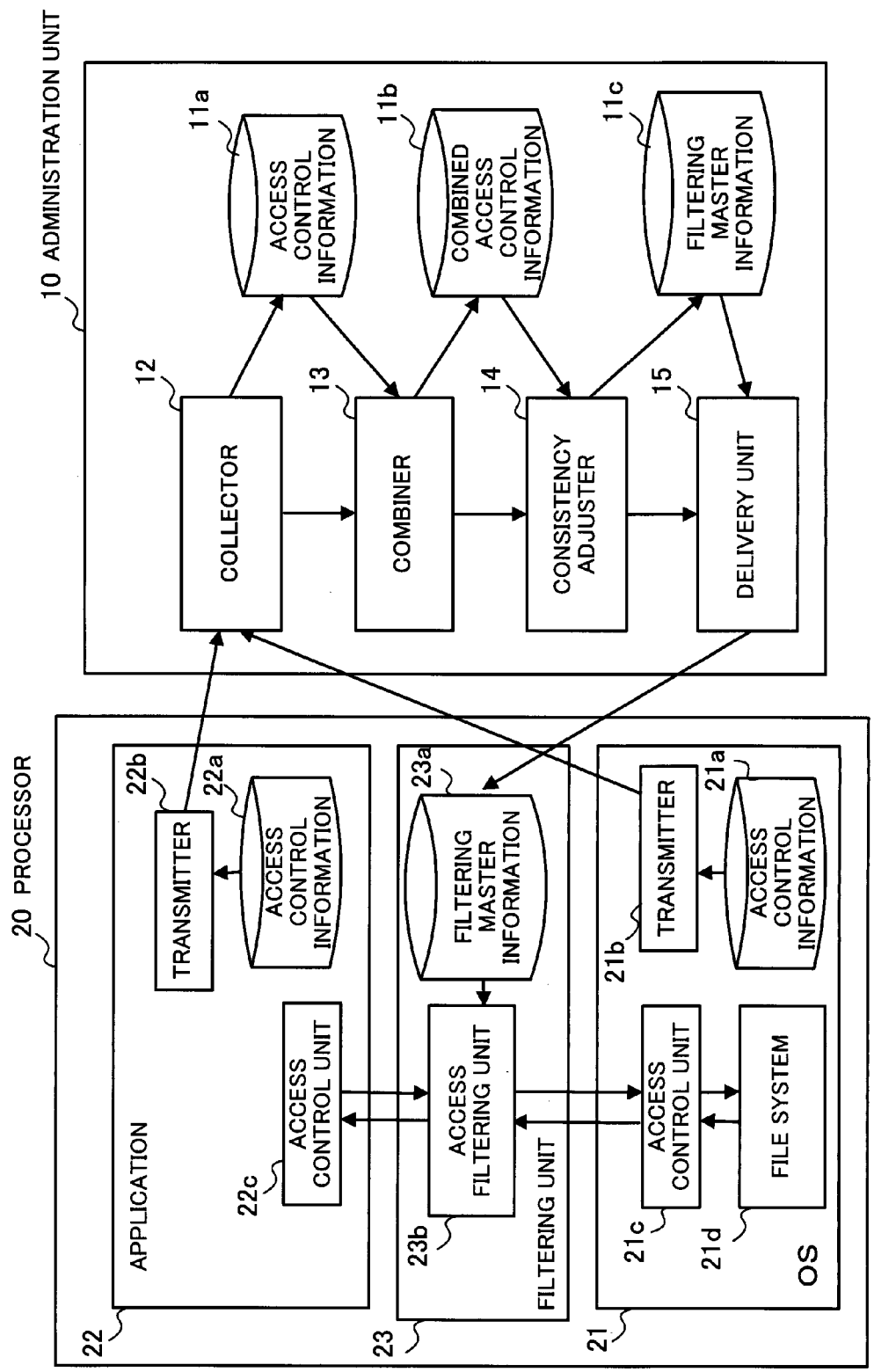
FIG. 1 is a conceptual view of the present invention that is implemented in one embodiment.

FIG. 1 is a conceptual view of the invention that is implemented in one embodiment.

An access control system according to the invention has an administration unit 10 for managing access control settings, and a processor 20 that is provided with prescribed processing functions for performing access control to resources. The processor 20 and the administration unit 10 may be installed together on an access control device, or may be installed on different devices in the access control system.

The administration unit 10 has memory units and processing units. The memory units include an access control information memory 11a, a combined access control information memory 11b, and a filtering master information memory 11c. The processing units include a collector 12, a combiner 13, a consistency adjuster 14, and a delivery unit 15. The processing functions of these units can be realized by a computer executing an access control program.

The access control information memory 11a stores access control information and resource information set for each unit of processing, which were transmitted from transmitters 21b and 22b and collected by the collector 12. The access control information defines access control settings (hereinafter, this is also referred to by access control policy) such as entities (hereinafter, referred to as subject) of which accesses are controlled, objective resources to which accesses are controlled, and access permission/denial. The resource information is information that is stored in an OS 21 and so on as system information, and defines the identifier names of retained resources and the structure of the resources, which will be described in detail later.

The combined access control information memory 11b stores combined access control information that the combiner 13 created by combining access control information each set for each unit of processing. Since the combined access control information is information created by simply combining access control information collected by the collector 12, consistency of included access control settings is not guaranteed. In addition, the combined access control information memory 11b also stores resource inclusion relation information which was created by combining resource information and defines inclusion relations between resources.

The filtering master information memory 11c stores combined access control information adjusted by the consistency adjuster 14, as filtering master information to be shared in the system.

The collector 12 collects the access control information and the resource information from the transmitters 21b and 22b each arranged for each unit of processing, and stores them in the access control information memory 11a. Alternatively, the collector 12 may directly acquire the access control information and the resource information, not via the transmitters 21b and 22b.

The combiner 13 combines the access control information and the resource information individually, which were collected from the units of processing and have been stored in the access control information memory 11a. The combiner 13 compiles the access control information, each of which is set for each unit of processing, and rearranges the information, for example, by subject specified in the access control information. By doing so, duplicate access control settings for each subject can be identified easily. The combiner 13 simply combines the access control information, so that consistency of the access control settings defined in the combined access control information is not guaranteed. In addition, the combiner 13 combines the resource information to create resource inclusion relation information. In units of processing, different identifier names may be given to an identical objective resource in access control information. For example, the OS 21 and a database system give different identifier names to a database. Therefore, only comparison of identifier names does not detect identical resources. In addition to the difference in the identifier names of an identical resource, a resource specified in one access control information may be included in a resource specified in another access control information. For example, if a database and a table included in the database are specified as resources, the resources should be identified as identical. For this reason, it is necessary to analyze the structure of resources in the entire system based on the resource information to detect the inclusion relations between the resources. The created combined access control information and resource inclusion relation information are stored in the combined access control information memory 11b.

The consistency adjuster 14 determines based on the combined access control information and the resource inclusion relation information, which were created by the combiner 13, whether the access control settings defined in the combined access control information are inconsistent. That is, with respect to a certain subject, it is determined whether there are some access control settings for resources that are identified as identical based on the resource inclusion relations. If yes, these access control settings are checked to find whether the defined operation conditions are inconsistent. An inconsistency is determined when one setting permits a certain type of operation but another setting denies, for example, when one setting allows to writing on a resource while the other setting does not. If the inconsistency is detected, the access control settings are corrected in accordance with an inconsistency measure policy describing measures, in order to make them consistent. For example, the inconsistency is resolved by deleting one side's access control settings. This process follows measures prescribed in the inconsistency measure policy. The inconsistency measure policy describes measures to resolve inconsistencies, such as "manual", "denial is prioritized", "permission is prioritized", and "follow an order of priority set to each unit of processing in access control information". The combined access control information without inconsistency is stored in the filtering master information memory 11c as filtering master information.

The delivery unit 15 delivers the filtering master information created by the consistency adjuster 14 to filtering units 23 that share the filtering master information to determine whether to permit or deny accesses to resources. If processors 20 are arranged in a plurality of devices, the deliver unit 15 delivers the filtering master information to the filtering units of the processors 20. On the other hand, if the filtering unit 23 is arranged in the same device and therefore is capable of accessing the filtering master information memory 11c, such delivery may be eliminated.

The processor 20 has the OS 21 for basic processing, an application 22 for general-purpose processing, and the filtering unit 23 for determining whether to permit or deny accesses.

The OS 21 and the application 22 have access control information memories 21a and 22b, the transmitters 21b and 22b, and access control units 21c and 22c, respectively. The filtering unit 23 has a filtering master information memory 23a and an access filtering unit 23b.

The access control information memories 21a and 22a store access control information set for corresponding units of processing (OS 21 and application 22). The transmitters 21b and 22b transmit to the administration unit 10 the access control information stored in the corresponding access control information memories 21a and 22a. The transmitters 21b and 22b perform the transmission as agents. Since the agents transmit access control information and resource information when setting is updated or the like, the administration unit 10 can keep update information even if it does not know where the access control information and resource information are stored and when the information was updated.

When an access request to a resource is made, the access control unit 21c, 22c asks the access filtering unit 23b to determine whether to permit or deny the access, and performs the access control according to the obtained determination result. In this figure, the access control unit 21c of the OS 21 controls accesses from the file system 21d that manages files. The OS 21 has other various processing functions, and such an access control unit is provided for each processing function.

The filtering master information memory 23a stores filtering master information received from the delivery unit 15 of the administration unit 10.

The access filtering unit 23b performs access filtering by determining based on the filtering master information whether to permit or deny an access, in response to a request specifying a subject and an objective resource from the access control unit 21c, 22c, and then returns the determination result to the requesting access control unit 21c, 22c.

The operations of the above access control system will be described.

The access control information memories 21a and 22a store access control information describing access control policies of "what rights subjects have to access resources" set by respective administrators. The access control information stored in the access control information memory 21a is used when an access to a resource is made from the file system 21d of the OS 21. The access control information stored in the access control information memory 22a is used when an access to a resource is made while the application 22 runs. The transmitters 21b and 22b read access control information from the corresponding access control information memories 21a and 22a, and transmit it to the collector 12 of the administration unit 10. Similarly, the transmitters 21b and 22b also read resource information describing the structure of resources and transmit it to the collector 12. The collector 12 of the administration unit 10 stores the received access control information and resource information in the access control information memory 11a. In this way, all access control information and resource information dispersedly stored in the system are collected into the access control information memory 11a of the administration unit 10.

The administration unit 10 creates consistent access control information based on the collected access control information and resource information, as filtering master information for the entire system.

First, the combiner 13 combines the access control information stored in the access control information memory 11a to thereby create combined access control information. The combined access control information is a file containing all collected access control information, and is not guaranteed in consistency of the access control policies. For example, in the combined access control information, the access control information is rearranged by subject. In addition, all the resource information is analyzed to create resource inclusion relation information defining inclusion relations between resources. The combined access control information and the resource inclusion relation information are stored in the combined access control information memory 11b.

Then, the consistency adjuster 14 reads the combined access control information and the resource inclusion relation information from the combined access control information memory 11b, and determines whether the access control settings defined in the combined access control information are inconsistent. The consistency adjuster 14 detects, for each subject, whether there are some access control settings for resources that are identified as identical based on the resource inclusion relations, and then determines whether the access control settings are inconsistent. If an inconsistency is detected, the consistency adjuster 14 resolves the inconsistency of the access control settings in accordance with an inconsistency measure policy. For example, one side's access control information is deleted. The resultant consistent combined access control information is stored in the filtering master information memory 11c as filtering master information. In this way, the filtering master information comprising only consistent access control information in the system is created.

The filtering master information is delivered from the delivery unit 15 to the filtering unit 23 that determines permission or denial of accesses in response to access filtering requests from the access control units 21c and 22c. Then, the filtering unit 23 stores the received filtering master information in the filtering master information memory 23a.

The file system 21d of the OS 21 and the application 22 activate the corresponding access control units 21c and 22c when an access to a resource is required while executing processing. The access control unit 21c, 22c issues an access filtering request specifying a subject, an objective resource, and operation details to the access filtering unit 23b. The access filtering unit 23b determines whether to permit or deny the access, based on the specified subject, objective resource, and operation details, and the filtering master information stored in the filtering master information memory 23a, and returns the determination result to the requesting unit. The access control unit 21c, 22c performs the access control based on the result.

As described above, according to the invention, the administration unit 10 collects and combines the access control information and resource information that are dispersedly stored within a system, and resolves inconsistency of access control settings in accordance with the inconsistency measure policy, to thereby create the filtering master information comprising consistent access control policies for the entire system. By sharing the filtering master information, consistent access control can be guaranteed in the entire system.

In addition, the inconsistency measure policy can be desirably set according to a system. For example, access control policies can be set according to the system specifications in such a way that security is prioritized, usability is prioritized, or the like. Therefore, combined access control policies guaranteeing a security level suitable for the system can be set as the filtering master information.

Next explanation is about a case where one embodiment is applied to systems dispersedly arranged on a network, with reference to the accompanying drawings. In the following explanation, data managed in databases are taken as objective resources for access control.

Figure 2:
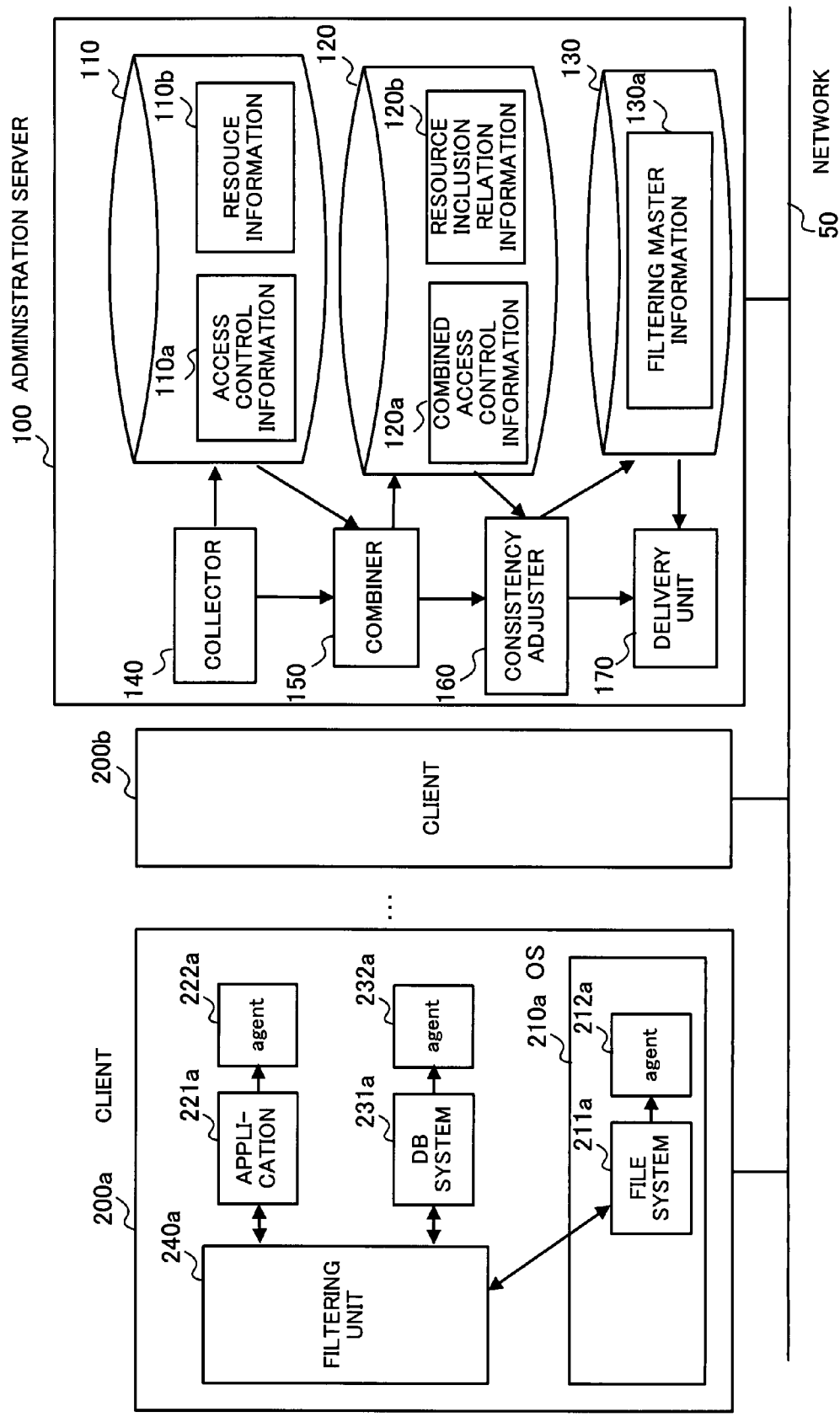
FIG. 2 shows the configuration of an access control system according to the embodiment of this invention.

FIG. 2 shows the configuration of the access control system according to the embodiment of the invention.

In the access control system according to the embodiment, clients 200a and 200b for prescribed processing and an administration server 100 for managing access control policies for the entire system are connected to each other over a network 50. It should be noted that many clients can be connected.

The administration server 100 has an access control information database 110, a combined access control information database 120, a filtering master information database 130, a collector 140, a combiner 150, a consistency adjuster 160, and a delivery unit 170.

The access control information database 110 contains access control information 110a and resource information 110b which were dispersedly stored within the system and were collected by the collector 140. The combined access control information database 120 contains combined access control information 120a created by combining the access control information 110a and resource inclusion relation information 120b created by combining the resource information. The filtering master information database 130 contains filtering master information 130a comprising consistent access control policies for the entire system. These information will be described in detail later.

The collector 140 stores in the access control information database 110 the access control information 110a and resource information 110b, which were set for each unit of processing and transmitted from agents 212a, 222a, and 232a. The combiner 150 creates the combined access control information 120a by combining the access control information 110a collected from the entire system. In addition, the combiner 150 creates resource inclusion relation information 120b describing the resource structure based on the resource information 110b, and stores these information in the combined access control information database 120. The consistency adjuster 160 extracts access control settings that specify an identical subject and identical or overlapping resources, from the combined access control information 120a. Then the consistency adjuster 160 compares the operation conditions of an operation in the extracted access control settings, to detect whether inconsistent settings, or access permission and denial are set for the operation. If the access control settings are inconsistent, one side's setting is deleted in accordance with an inconsistency measure policy. Thus created filtering master information that is consistent for the entire system is stored in the filtering master information database 130. The delivery unit 170 delivers the filtering master information 130a to filtering units 240a of the clients 200a and 200b.

The client 200a has an OS 210a, a database system 231a, an application 221a, the filtering unit 240a, and agents 212a, 222a, and 232a, and performs access control based on the filtering master information created by the administration server 100. It should be noted that the client 200b has an identical configuration to the client 200a. In the following description, the clients 200a and 200b are collectively referred to as a client 200 if it is unnecessary to indicate a specific client 200a, 200b.

The agents 212a, 222a, and 232a collect access control information and resource information set for corresponding units of processing, and send them to the administration server 100. A file system 211a functioning as a part of the OS 210a, the database system 231a, and the application 221a each asks the filtering unit 240a to determine whether to permit or deny an access request to a resource when the access request is made while executing processing, and controls the access based on the determination result. The filtering unit 240a performs access filtering by determining whether to permit or deny the access request based on the filtering master information, and returns the result.

Figure 3:
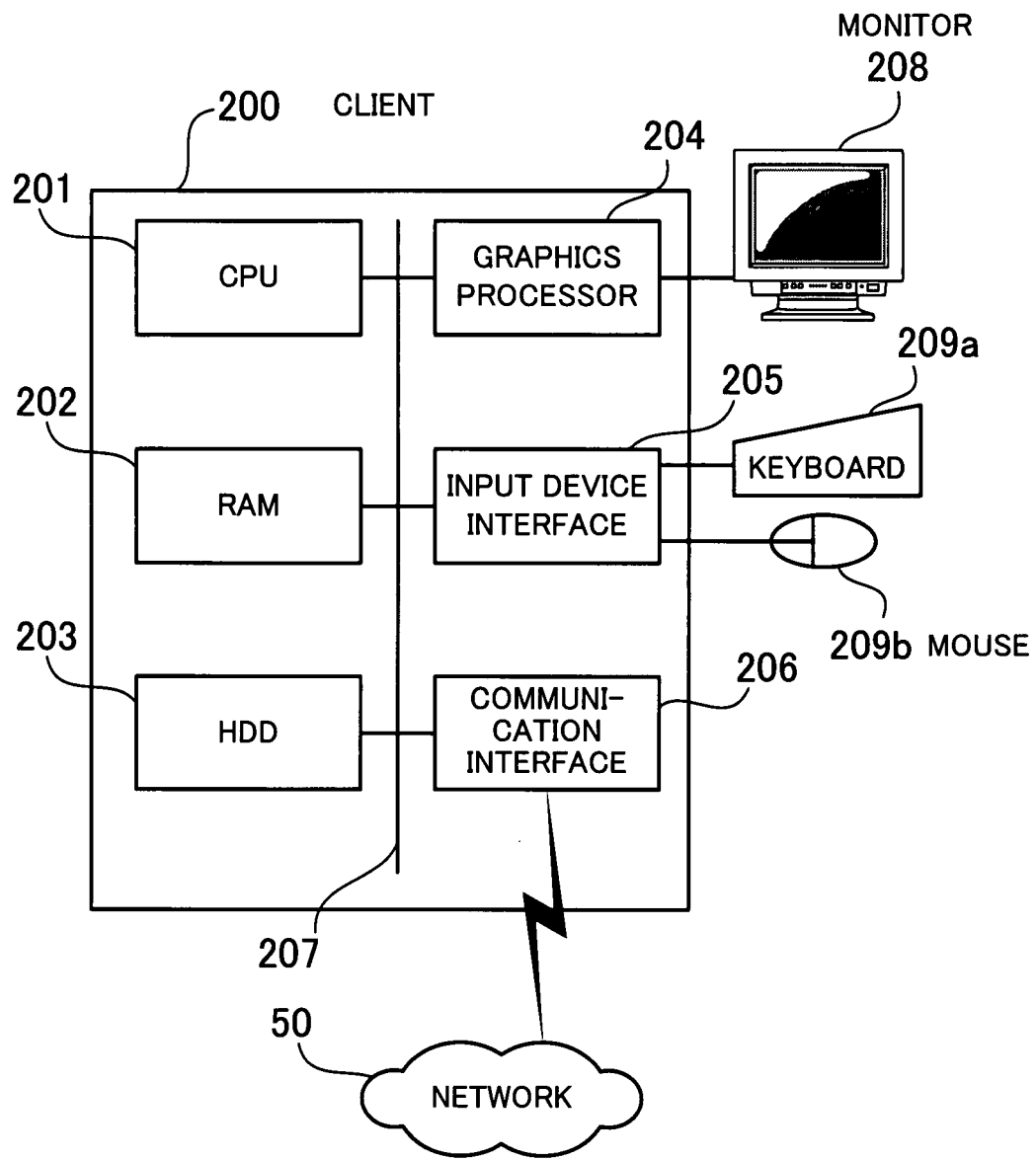
FIG. 3 is a block diagram showing an example hardware configuration of a client according to the embodiment.

Now, the hardware configuration of the client 200 will be described with reference to FIG. 3.

The client 200 is entirely controlled by a central processing unit (CPU) 201. Connected to the CPU 201 via a bus 207 are a random access memory (RAM) 202, a hard disk drive (HDD) 203, a graphics processor 204, an input device interface 205, and a communication interface 206.

The RAM 202 temporarily stores part of an Operating System (OS) program and application programs to be executed by the CPU 201. In addition, the RAM 202 stores various kinds of data required for CPU processing. The HDD 203 stores the OS and the application programs.

Connected to the graphics processor 204 is a monitor 208. The graphics processor 204 displays images on the screen of the monitor 208 under the control of the CPU 201. Connected to the input device interface 205 are a keyboard 209a and a mouse 209b. The input device interface 205 transfers signals from the keyboard 209a and the mouse 209b to the CPU 201 via the bus 207. The communication interface 206 is connected to a network 50. The communication interface 206 communicates data with another computer over the network 50.

With such a hardware configuration, the processing functions of the embodiment can be realized. It should be noted that the hardware configuration of the client 200 illustrated in FIG. 3 is also applied to the administration server 100.

Now, the information held by the administration server 100 will be described.

FIGS. 4A and 4B show examples of access control information that is collected by the administration server, according to the embodiment. FIG. 4A shows access control information of the OS while FIG. 4B shows access control information of the database system.

"User/group" is an identifier number that identifies a subject for which an access right is set. "Resource" is the name of a resource to which accesses are controlled. "Operation" is an operation to be controlled in the access right. "R" represents reading from a resource and "W" represents writing on a resource. "Insert", "delete", "update", and "select" are operations to be made on a database, and represent insertion, deletion, updating, and selection, respectively. "Permission" shows whether to permit or deny accesses. "1" indicates that accesses are to be permitted while "0" indicates that accesses are to be denied. "Denial" of "1" indicates that accesses are to be denied while "0" indicates that accesses are to be permitted. "Valid period" shows "start" and "end" of a period during which the access control policy is valid. "Device" is a device to which the access control policy is applied.

For example, the access control policy 111a of the access control information 111 of the OS can be interpreted that an access is to be "permitted" when the access request is made from a device "xxx1" and the access request indicates that a subject "00000001" is going to perform an operation "RW" on a resource "yyy1.xls". In addition, this policy is valid from "Apr. 1, 2005". The access control policy 112a of the access control information 112 of the database system can be interpreted that an access is to be "denied" when the access request is made from a device "xxx2" and the access request indicates that a subject "00000001" is going to perform an operation "delete" on a resource "DB3". In addition, the valid period of this policy is the same as the policy 111a.

As can be clear from these figures, the access control information 111 of the OS and the access control information 112 of the database system use different identifier names in "resource" and different descriptions in "operation". Therefore, it cannot be known from these access control information relations between resources, for example, relations between "xxx1.db" and "xxx2.db" of the access control information 111 and "DB1" and "DB2" of the access control information 112. Therefore, the resource information describing the resource structure is also collected to detect inclusion relations between the resources. In addition, operations that can be identified as equivalent in an adjusting process are preset as well.

FIGS. 5A and 5B show examples of resource information that is collected by the administration server, according to one embodiment. FIG. 5A shows resource information of the OS while FIG. 5B shows resource information of the database system.

The resource information 113 of the OS is information that is held by the OS as system information and describes the resource structure in view of the OS. For example, this information shows that the OS has databases given OS-specific identifier names "xxx1.db" and "xxx2.db".

The resource information 114 of the database system is information that is held by the system database and describes the resource structure in view of the database system. For example, this information shows that the OS-specific identifier name "xxx1.db" is "DB1" in the database system and there are three tables of "Atable1", "Atable2", and "Atable3".

Figure 6:
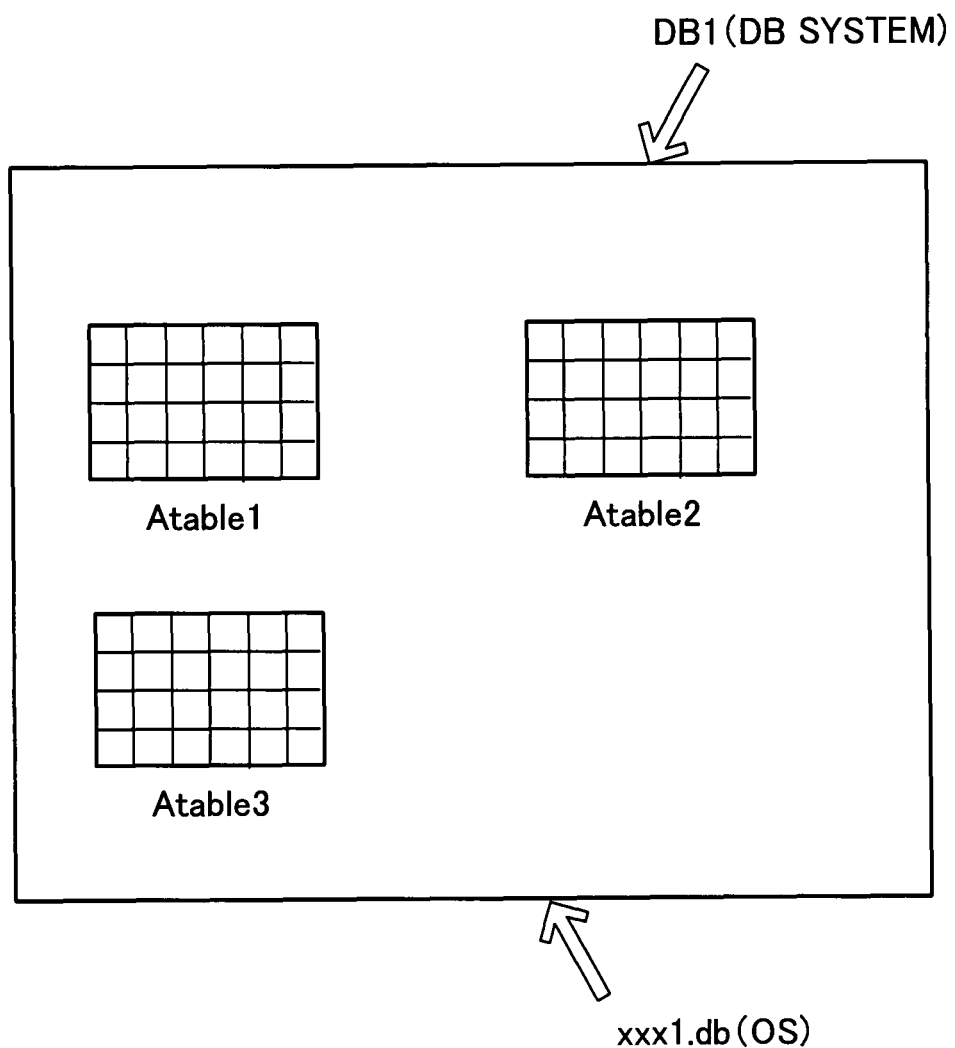
FIG. 6 shows relations between resources according to the embodiment of this invention.

FIG. 6 shows relations between resources according to the embodiment of the invention.

Referring to this figure, an OS-specific identifier name "xxx1.db" and a database system-specific identifier name "DB1" identify an identical memory unit, and this memory unit has "Atable1", "Atable2", and "Atable3".

Based on the above resource information, the combiner 150 creates resource inclusion relation information. FIG. 7 shows an example of resource inclusion relation information to be created by the combiner according to the embodiment of the invention.

The resource inclusion relation information 121 has number 121a, resource 121b, and parent resource 121c. The number 121a is an identifier number that identifies a resource. The resource 121b is an identifier name that was uniquely given to the resource by a corresponding unit of processing. The parent resource 121c is the identifier number of a parent resource that includes the resource.

For example, the number "1" is a resource that is identified by an identifier name "xxx1.db" in the OS, and is positioned at the top level. The next number "2" is a resource that is identified by the identifier name "DB1" in the database system, and its parent resource is "xxx1.db" of number "1". The number "3" is a resource that is identified by an identifier name "Atable1" in the database system, and its parent resource is "DB1" of number "2". These parent-child relations are set based on the resource information 114.

In this way, regarding all resources included in the resource information, their inclusion relations are sequentially set.

In addition, the combiner 150 creates the combined access control information based on the collected access control information. FIG. 8 shows an example of combined access control information to be created by the combiner according to the embodiment.

The illustrated combined access control information 122 has PRO hash value 122a, collision identifier (ID) 122b, subject (global ID) 122c, resource 122d, operation 122e, permission 122f, denial 122g, policy information 122h, and reference quantity 122i, and is created by combining the access control information 111 and 112 collected from the entire system and adding various information thereto.

The PRO hash value 122a and the collision ID 122b are information to be used so that the filtering unit 240 can search the access control policies in a shorter time, and are set after the access control information 111 and 112 are combined. The PRO hash value 122a is a hash value created based on access control policy data. The collision ID 122b is an identifier number to be referred to when hash values match each other. Similarly, the reference quantity 122i is used in order that the filtering unit 240 can search the access control policies in decreasing order from the largest reference quantity. The reference quantity 122i may be set by the filtering unit 240. These information do not directly relate to access control policies.

The subject (global ID) 122c, the resource 122d, the operation 122e, the permission 122f, the denial 122g are set by extracting corresponding items from the access control information 111 and 112. The subject (global ID) 122c corresponds to "user/group" of the access control information 111, 112. The policy information 122h is information indicating a unit of processing for which the access control policy is set. For example, "OS" indicates that the access control policy is access control information 111 collected from the OS 210.

The "DB" indicates that the access control policy is access control information 112 collected from the database system 231. It should be noted that the valid period and device of the access control information 111 and 112 are not included but these information may be included.

The combiner 150 extracts access control information from the access control information database 110 and adds policy information 122*h* according to the source of the information to the information. Then, the combiner 150 rearranges the information by subject (user/group). Further, the combiner 150 calculates the hash value, sets the PRO hash value 122*a* and collision ID 122*b*, and secures a region for the reference quantity 122*i*. Thus created combined access control information 122 is stored in the combined access control information database 120.

As described above, the combiner 150 creates the combined access control information 122 by combining the access control information 111 and 112 for the entire system. This information is not guaranteed in consistency of included access control policies.

Then, the consistency adjuster 160 detects and eliminates inconsistency in access control policies of the combined access control information 122. The consistency adjuster 160 detects access control policies specifying an identical subject, identical resource, and equivalent operations. Specifically, it is determined based on the resource inclusion relation information 121 created by the combiner 150 whether resources are identical.

For example, based on the resource inclusion relation information 121, resources "xxx1.db", "DB1", "Atable1", "Atable2", and "Atable3" are identified as identical. In the example of this figure, the access control policy 122-1 describes "subject=00000001, resource=xxx1.db, operation=RW, permission=0, and denial=1" and the access control policy 122-2 describes "subject=00000001, resource=DB1, operation=insert, permission=1, and denial=0". Comparison of these access control policies 122-1 and 122-2 results in detecting an identical subject. In addition, the resources "xxx1.db" and "DB1" are identified as identical. As to operation, since "insert" involves writing on a resource, the "insert" can be recognized as an operation equivalent to "W". As a result, the access control policies 122-1 and 122-2 are determined as identical in subject and resource.

In this connection, by previously setting operation mapping information describing relations between operations, it can be determined based on the information whether operations can be identified as equivalent.

Figure 9:
FIG. 9 shows an example of operation mapping information that a consistency adjuster refers to, according to the embodiment of this invention.

FIG. 9 shows an example of operation mapping information that the consistency adjuster refers to, according to the embodiment.

In the illustrated operation mapping information 123, operations are categorized into three: "read", "write/insert/update/delete", and "execute". The "OS" and the "database system" give different operation names. With reference to the operation mapping information 123, "W" and "insert" in the above example can be identified as equivalent operations.

Further, as to access control policies specifying an identical subject and an identical resource, it is determined whether the policies are inconsistent (for permission and denial). In this example, the access control policy 122-1 shows "permission=0 and denial=1" and the access control policy 122-2 shows "permission=1, denial=0". Therefore, it is determined that the access control policies 122-1 and 122-2 are inconsistent and therefore a process for resolving this inconsistency is performed in accordance with an inconsistency measure policy.

Figure 10:
FIG. 10 shows an example inconsistency measure policy that the consistency adjuster refers to, according to the embodiment of this invention.

FIG. 10 shows an example of an inconsistency measure policy that the consistency adjuster refers to, according to the embodiment.

The illustrated inconsistency measure policy 124 includes four policies: "1: manual setting", "2: operation disabling", "3: operation enabling", and "4: order of priority". As the inconsistency measure policy 124, one out of these policies is previously selected for the entire system. Alternatively, these policies can be selected for each type of resources or for each subject.

The "manual setting" is a policy where a user is notified of inconsistency of access control policies when the inconsistency is detected, and the user is requested to manually resolve the inconsistency.

The "operation disabling" is a policy where an access control policy having "denial=1" is prioritized and an access control policy having "permission=1" is deleted when inconsistency is detected. This corrects the policies so as to enhance a security level.

On the contrary to the "operation disabling", the "operation enabling" is a policy where an access control policy having "permission=1" is prioritized when inconsistency is detected.

The "order of priority" is a policy where with reference to "policy information" of inconsistent access control policies, an access control policy having a lower priority is deleted according to an order of priority set to policy setting sources. For example, assume that the access control information of the OS has the first priority and the access control information of the database system has the second priority. In this case, if an access control policy of the OS and an access control policy of the database system are inconsistent, the access control policy of the OS is prioritized and the access control policy of the database system is deleted.

Next explanation is about an adjusting process to be performed on the combined access control information 122 under these inconsistency measure policies.

In the case where "manual setting" is selected, the user is notified that the access control policies 122-1 and 122-2 are inconsistent. Then, one of the access control policies 122-1 and 122-2 is deleted in accordance with a user command.

The adjusting process to be performed by the consistency adjuster under the other inconsistency measure policies will be described with reference to FIGS. 11A, 11B, and 11C. Each figure shows a part of the combined access control information 122 of FIG. 8. FIG. 11A shows an adjusting process under "operation disabling". FIG. 11B shows an adjusting process under "operation enabling". FIG. 11C shows combined access control information subjected to an adjusting process under "order of priority".

In the case where the "operation disabling" is selected, the access control policy 122-1 specifying "denial=1" is prioritized and the access control policy 122-2 specifying "permission=1" is deleted, as shown in FIG. 11A.

In the case where the "operation enabling" is selected, the access control policy 122-2 specifying "permission=1" is prioritized and the access control policy 122-1 specifying "denial=1" is deleted, as shown in FIG. 11B.

In the case where the "order of priority" is selected, an access control policy to be deleted is determined based on policy information. If the access control policies of the OS are prior to the access control policies of the database system, the access control policy 122-1 having "policy information=OS" is prioritized and the access control policy 122-2 having "policy information=DB" is deleted, as shown in FIG. 11C.

As described above, in the case where inconsistent access control policies are detected by searching the combined access control policies, an access control policy having a higher priority is kept and an access control policy having a lower priority is deleted in accordance with an inconsistency measure policy. Thereby, the inconsistency is resolved, resulting in guaranteeing the consistency of access control policies for the entire system. After the adjusting process is completed, the resultant information is stored in the filtering master information database 130 as filtering master information.

The delivery unit 170 delivers the created filtering master information to all filtering units 240 provided in the system so as to share the filtering master information. The filtering unit 240 determines whether to permit or deny accesses, based on the received filtering master information, thus making it possible to guarantee consistency of access control policies in the entire system.

In the case where one or both of an access control policy and resource setting, which were individually set, are changed, for example, a corresponding agent detects the change and transmits the changed access control information and/or resource information to the administration server 100. The administration server 100 performs the combination process and the adjusting process based on the access control information and resource information obtained from agents and updates the filtering master information. Thus, the access control policies for the entire system can keep its consistency.

Figure 12:
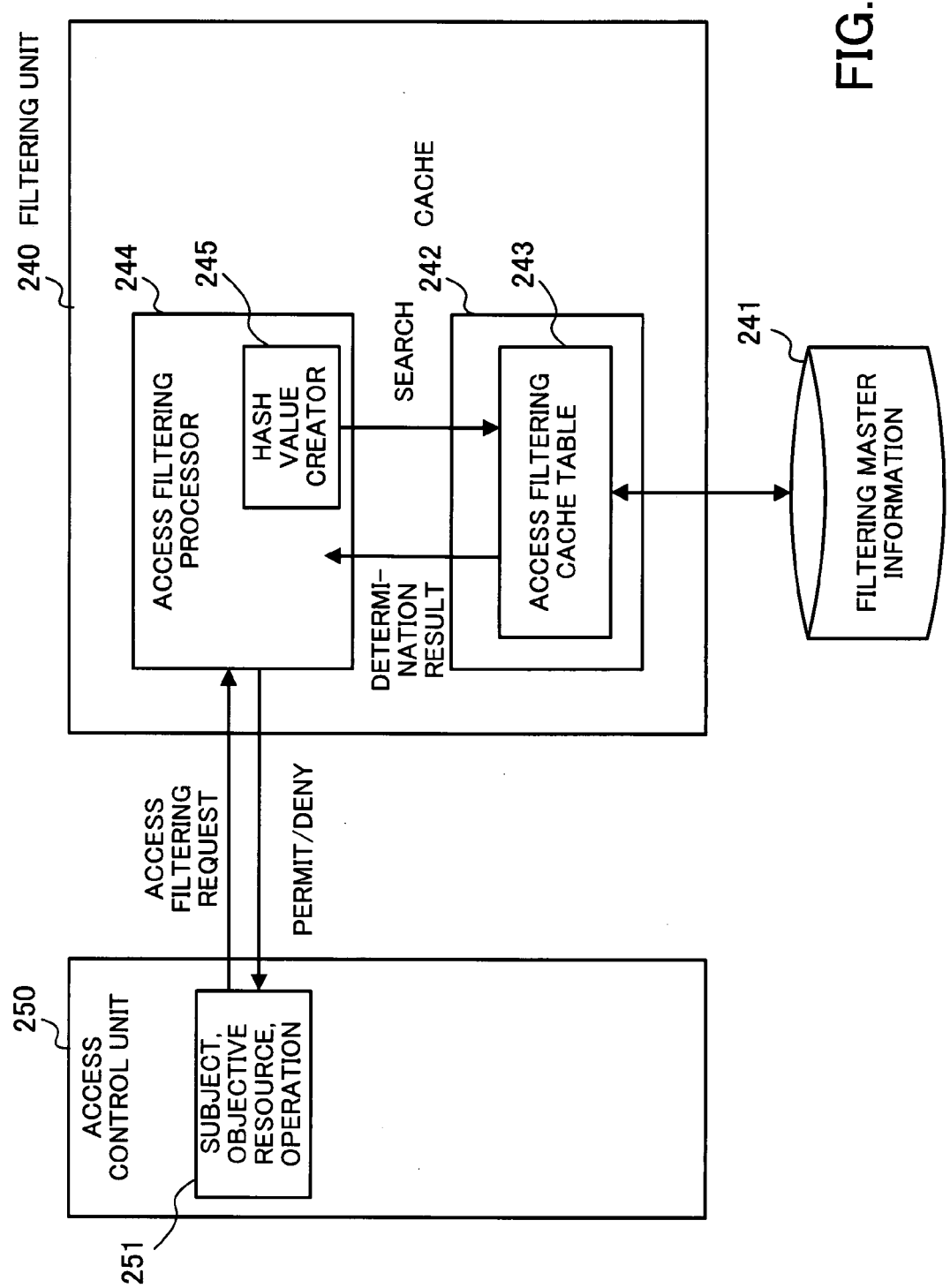
FIG. 12 shows an access control process of a client according to the embodiment of this invention.

Now, an access control process to be performed by the client 200 that has obtained the filtering master information will be described with reference to FIG. 12.

A filtering unit 240 of the client 200 has a cache 242 and an access filtering processor 244, and accesses a filtering master information memory 241 to determine whether to permit or deny an access in response to an access filtering request from an access control unit 250.

The filtering master information memory 241 stores filtering master information received from the delivery unit 170 of the administration server 100. In addition, the cache 242 has an access filtering cache table containing entries that are control access policies frequently used in access filtering out of the access control policies contained in the filtering master information. For example, an access filtering cache table 243 contains access control policies having the reference quantity from the largest down to 500, out of the access control policies in the filtering master information. Thereby fast search can be realized. The entries in the access filtering cache table 243 are appropriately updated. The access filtering processor 244 has a hash value creator 245 to calculate a hash value from an access filtering request from the access control unit 250 and search the access filtering cache table 243. Then, the access filtering processor 244 returns a result of permission or denial to the access control unit 250 according to the obtained determination result.

The access control unit 250 is an access control means installed in each unit of processing such as the application 221, the database system 231, and the file system 211. The access control unit 250 makes an access filtering request to the filtering unit 240 by using as arguments a subject, an objective resource, and an operation set in an access request.

When an access request to a resource is made while processing such as an application is executed, the client 200 having the above configuration makes an access filtering request to the filtering unit 240 by using as arguments 251 the subject, the objective resource, and the operation set in the access request. In the access filtering processor 244, the hash value creator 245 calculates a hash value based on the arguments 251, and searches the access filtering cache table 243 for an access control policy corresponding to the hash value. Then, based on the received arguments and extracted access control policy, the access filtering processor 244 determines whether to permit or deny the access, and returns the result to the access control unit 250.

As described above, by using the cache 242, the filtering unit 240 can realize fast search. Therefore, although combining the access control policies for the entire system increases a volume of the filtering master information, a search time can be suppressed.

Figure 13:
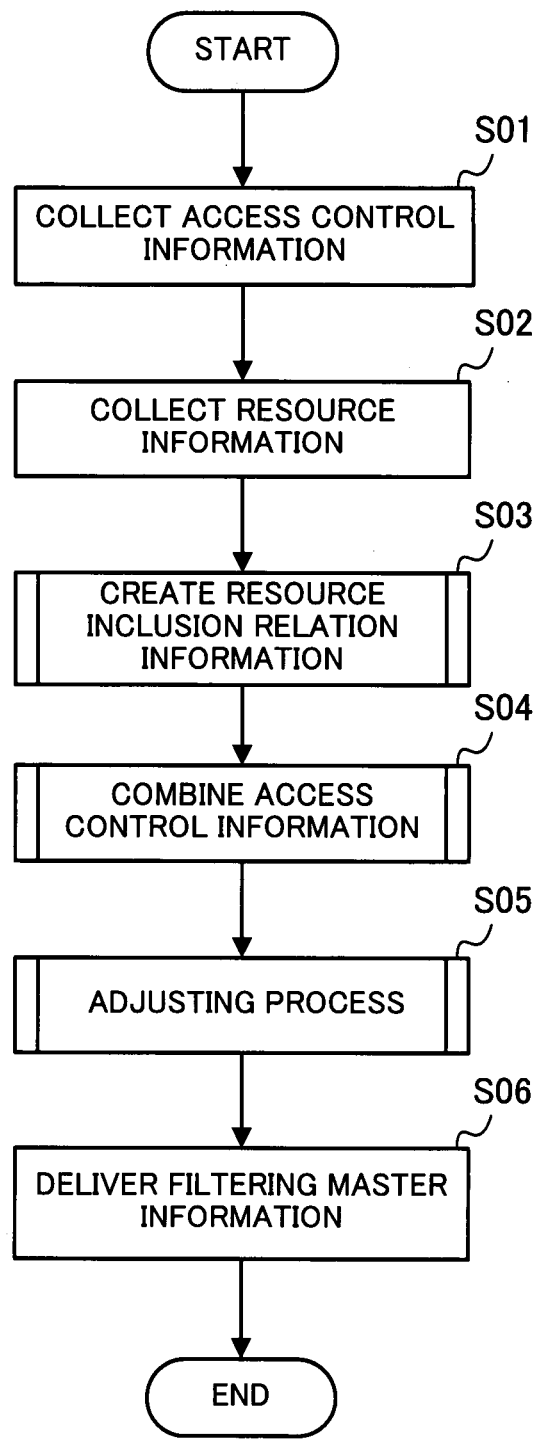
FIG. 13 is a flowchart of an access control process according to the embodiment of this invention.

Now, an access control process in the access control system will be described with reference to the flowchart of FIG. 13.

At step S01, access control information dispersedly stored in a system is collected, and is stored in the access control information database 110.

At step S02, resource information dispersedly stored in the system is collected, and is stored in the access control information database 110.

Out of the above steps, agents provided in clients collect the information. The administration server 100 stores the access control information and the resource information received from the agents in the access control information database 110.

By the above steps, the access control information and the resource information for the entire system are stored in the access control information database 110. The administration server 100 performs the following steps based on the colleted access control information and resource information.

At step S03, the resource information is read from the access control information database 110, and based on the resource structure detected from the read resource information, resource inclusion relation information representing relations between resource identifier names is created. This step will be described in detail later.

At step S04, the access control information is read from the access control information database 110, and is rearranged by user and is combined, thereby creating combined access control information. This step will be described in detail later.

At step S05, the combined access control information created at step S04 is checked to determine whether the included entries are inconsistent. Then, the adjusting process is performed in accordance with an inconsistency measure policy. The resultant consistent combined access control information is set as filtering master information. This step will be described in detail later.

At step S06, the filtering master information created at step S05 is delivered to the filtering units 240 that are arranged in the system to perform access filtering.

By the above processing procedure, the collected access control information in the entire system is combined and adjusted to eliminate inconsistency. Thus created filtering master information is delivered to the filtering units 240 that perform the access filtering in the system, and is referred in the access filtering process. As a result, consistent access control can be guaranteed in the system.

Now, the processes of steps S03, S04, and S05 will be described in detail.

Figure 14:
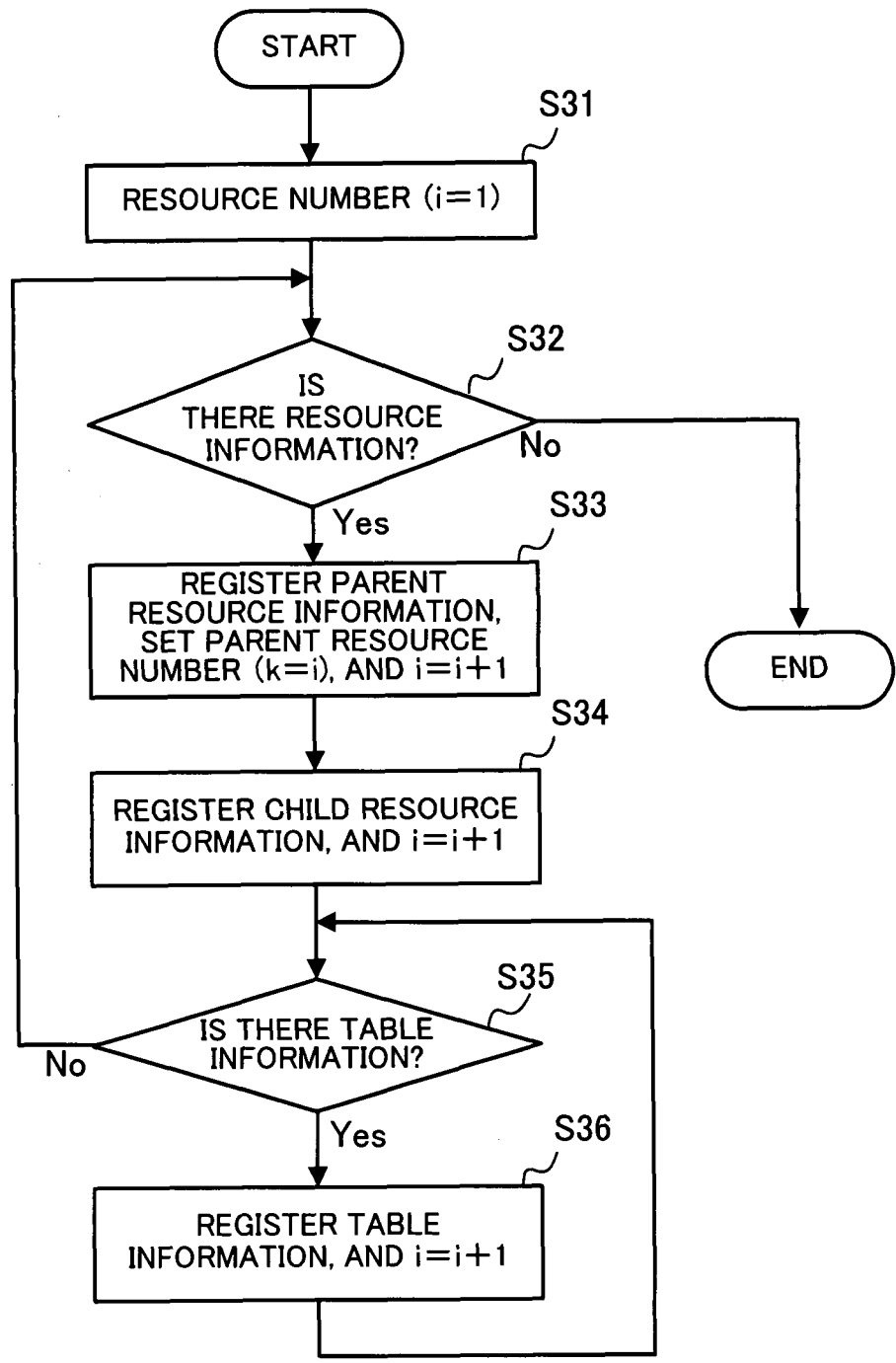
FIG. 14 is a flowchart showing how to create resource inclusion relation information, according to the embodiment of this invention.

FIG. 14 is a flowchart showing how to create resource inclusion relation information according to the embodiment.

After the resource information in the system is collected, this procedure starts. In the following explanation, a resource number is taken as i and a parent resource number is taken as k. In this connection, a parent resource is a resource of an identifier name defined in the OS. A child resource refers to a resource of another identifier name included in the parent resource. In addition, a parent resource and its child resources are called a resource group.

At step S31, a resource number (i) to be assigned to a resource is initialized to 1 in resource inclusion relation information.

At step S32, the resource information of the database system stored in the access control information database 110 is checked to determine whether there is resource information that has not been registered in the resource inclusion relation information. If there is, this procedure goes on to next step, and the procedure is completed otherwise.

At step S33, an OS-specific identifier name of the unregistered resource information of the database system is read and the resource number (i) is added as "number" of the resource inclusion relation information, and the OS-specific identifier name read from "OS-specific identifier name" is added. After the addition, the resource number (i) of the OS-specific identifier name is set as the parent resource number (k), resulting in k=i. In addition, the resource number (i) is incremented by one, resulting in i=i+1.

At step S34, the database-specific identifier name corresponding to the OS-specific identifier name registered as "resource" at step S32 is extracted from the resource information of the database system. In this connection, the resource of the database-specific identifier name has an inclusion relation with the OS-specific identifier name and is a child resource. Then, the resource number (i) and the parent resource number (k) are registered as "number" and "parent resource" in the resource inclusion relation information, respectively. Then, i is incremented by one, resulting in i=i+1.

At step S35, it is determined whether all tables stored in the database corresponding to the database-specific identifier name registered as "resource" at step S34 have been registered in the resource inclusion relation information. If there is an unregistered table, the procedure goes on to next step. If all tables have been registered, the procedure goes on to step S32 to process a next resource group.

At step S36, information on the unregistered table is registered in the resource inclusion relation information. The table name is extracted from the resource information of the database system, and is registered as "resource". The resource number (i) and the parent resource number (k) are registered as "number" and "parent resource", respectively. Then, i is incremented by one, resulting in i=i+1. The procedure goes back to step S35.

The above processing procedure will be specifically described by using the resource information 114 of the database system of FIG. 5 and the resource inclusion relation information 121 of FIG. 7.

At first, at step S33, an OS-specific identifier name "xxx1.db" is obtained from the resource information 114 of the database system, and is registered in the resource inclusion relation information 121. In this example, "1" and OS-specific identifier name "xxx1.db" are registered as the number 121a and the resource 121b, respectively. Then, at step S34, information on a corresponding database-specific identifier name is added on the next line of the OS-specific identifier name "xxx1.db". A database-specific identifier name "DB1", "2", and "1" are registered as the resource 121b, the number 121a, and the parent resource 121c. Then, at step S36, the tables contained in the database of the OS-specific identifier name "DB1" are registered.

Figure 15:
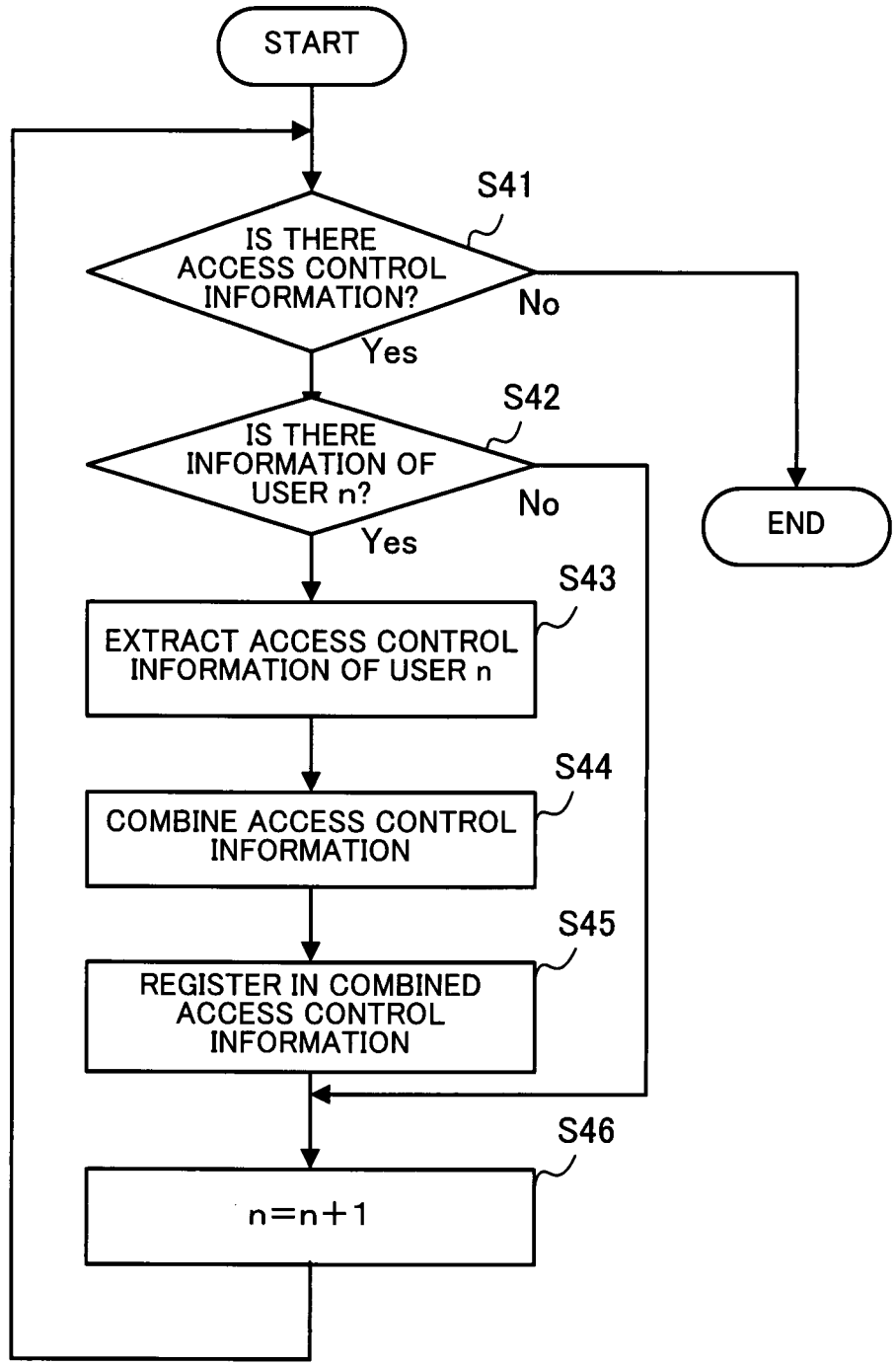
FIG. 15 is a flowchart showing how to combine access control information, according to the embodiment of this invention.

FIG. 15 is a flowchart showing how to combine access control information according to the embodiment.

After the access control information in the system is collected, this procedure starts.

At step S41, the access control information contained in the access control information database 110 is checked to determine whether there is access control information unregistered in the combined access control information. If there is unregistered access control information, this procedure goes on to next step, and this procedure is completed otherwise.

At step S42, it is determined whether there is access control information specifying a user n (n is a user/group ID number and its initial value is 00000001). If yes, the procedure goes on to next step, and skips to step S46 otherwise.

At step S43, the access control information specifying the user n as "user/group" is extracted from the access control information database 110.

At step S44, the access control information specifying the user n, which has been extracted at step 43, is combined.

At step S45, the access control information specifying the user n, which has been combined at step 44, is registered following the registered entries of the combined access control information. As a result, a set of the access control information specifying the user n is added to the combined access control information.

At step 46, n indicating a user is incremented by one, resulting in n=n+1. Then, the procedure returns back to step S41 to extract and combine access control information on a next user.

Through the above procedure, all access control information in the system stored in the access control information database 110 is grouped by user and combined, thereby creating one file (combined access control information). In this connection, in the case where identifier information identifying "user/group" is different from this embodiment, the procedure is performed based on the format of the identifier information.

Figure 16:
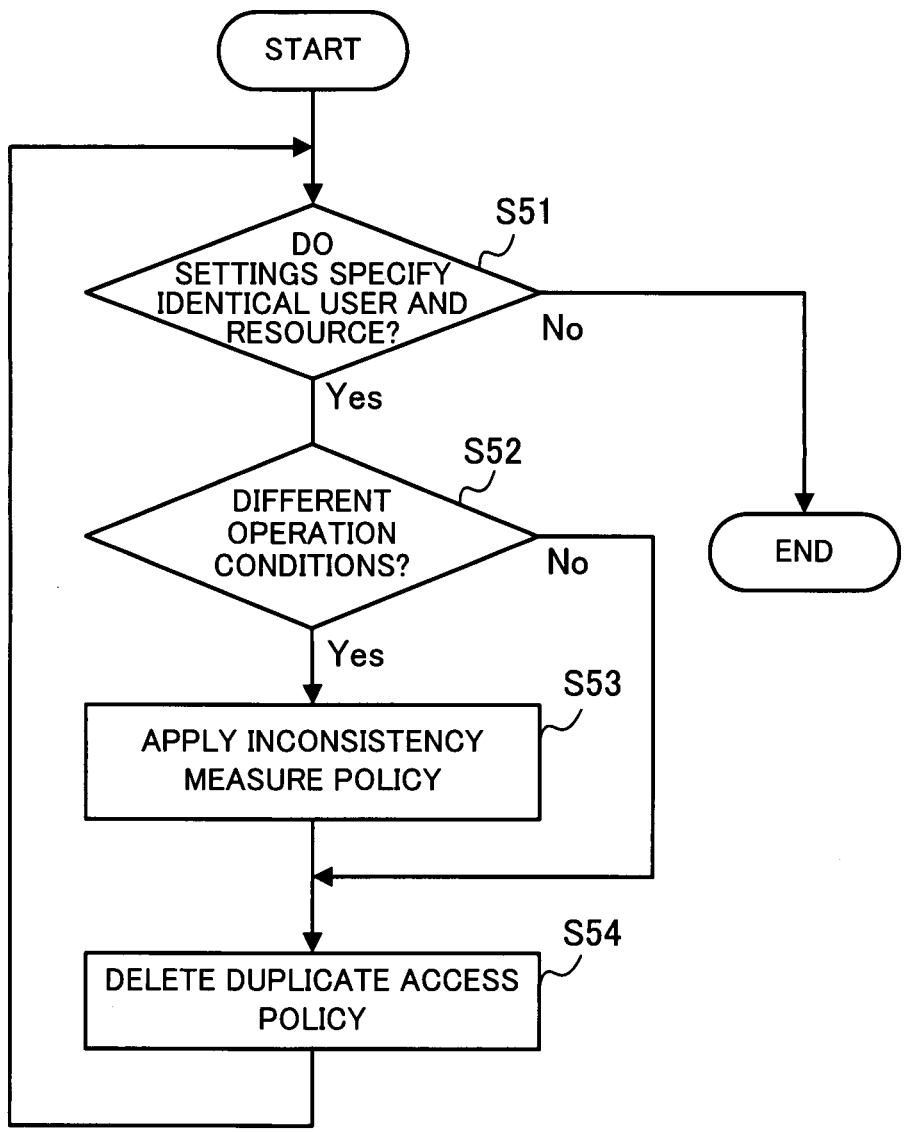
FIG. 16 is a flowchart of an adjusting process according to the embodiment of this invention.
Figure 17:
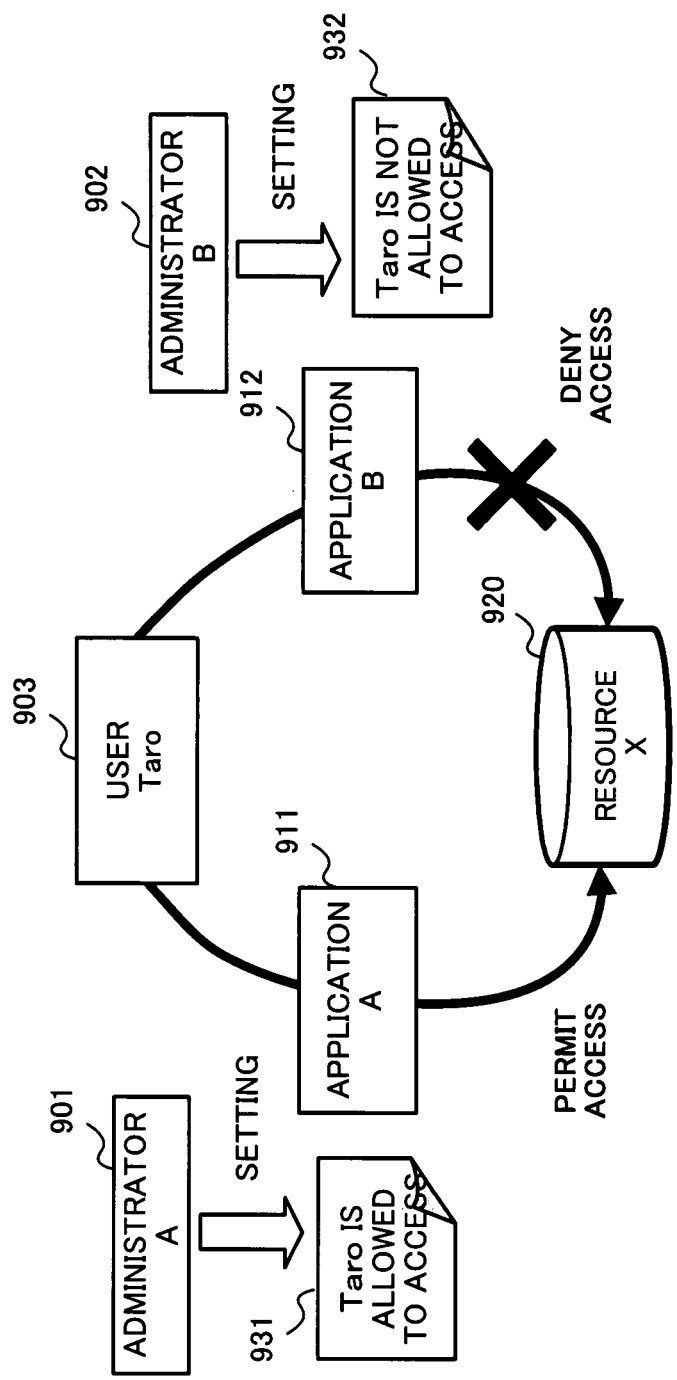
FIG. 17 shows conventional setting of access control policies.

FIG. 16 is a flowchart showing a procedure of an adjusting process according to the embodiment.

After the combined access control information and the resource inclusion relation information are created, this procedure starts.

At step S51, the combined access control information stored in the combined access control information database 120 is read and searched to determine whether there are access control policies specifying an identical user and an identical objective resource. If yes, this procedure goes on to next step, and the procedure is completed otherwise.

At step S52, it is determined whether the access control policies specifying the identical user and identical objective resource, which have been detected at step S51, define different operation conditions. If yes, the procedure goes on to next step, and to step S54 otherwise.

At step S53, an inconsistency measure policy is applied to the access control policies specifying the identical user, identical objective resource, and different operation conditions, in order to resolve the inconsistency.

At step S54, in the case where there are some access control policies specifying the identical user, identical objective resources, and same operation conditions, one access control policy is kept and the other access control policies are deleted. Then, the procedure returns back to step S51 to search for next inconsistent access control policies.

Through the above procedure, inconsistency in access control policies combined for the entire system can be resolved.

According to the access control according to the above-described embodiment of the invention, the administration server automatically analyzes access control policies dispersedly stored in the system to detect inconsistency, and if inconsistency is detected, resolves the inconsistency in accordance with a preset inconsistency measure policy. As a result, the access control policies can be made consistent for the entire system.

The processing functions described above can be realized by a computer. In this case, a program is prepared, which describes processes for the functions to be performed by the access control device that is an administration server. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVD), DVD-Random Access Memories (DVD-RAM), Compact Disc Read-Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to the invention, access control information and resource information, both dispersedly stored in units of processing, are collected and combined, to thereby create combined access control information. Then, access control settings included in the combined access control information are analyzed to detect inconsistency. If inconsistency is detected, inconsistent access control settings are corrected in accordance with an inconsistency measure policy, to resolve the inconsistency. Thereby filtering master information comprising consistent access control settings for the entire system is created. By sharing the filtering master information to determine whether to permit or deny accesses, consistent access control can be realized in the entire system.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium containing an access control program for performing access control to resources, the access control program causing a computer to execute a procedure comprising:
   collecting access control information and resource information on the resources, which are set for each unit of processing that executes prescribed processing and are stored in a memory unit of the each unit of processing;
   storing the access control information and the resource information in an access control information memory;
   combining the access control information stored in the access control information memory to create combined access control information including a plurality of access control settings;
   examining the resource information stored in the access control information memory to detect inclusion relations between the resources, and creating resource inclusion relation information describing the detected inclusion relations which indicate a parent resource that includes a child resource;
   analyzing the combined access control information to detect inconsistency between two access control settings specifying an identical subject, one further specifying the parent resource and the other further specifying the child resource included in the parent resource, based on the detected inclusion relations described in the inclusion relation information;
   correcting, if inconsistency is detected, the inconsistent access control settings in accordance with an inconsistency measure policy describing measures against the inconsistency to make the combined access control information consistent; and
   storing the consistent combined access control information in a filtering master information memory as filtering master information.

2. The computer-readable, non-transitory medium according to claim 1, wherein the analyzing determines based on the resource inclusion relation information whether resources specified in the access control settings are identical in terms of the inclusion relations.

3. The computer-readable, non-transitory medium according to claim 1, wherein the procedure further comprises extracting identifier information of subjects having access rights from the access control information, and rearranges the access control information by subject based on the identifier information of the subjects.

4. The computer-readable, non-transitory medium according to claim 1, wherein the procedure further comprises converting information of a prescribed item set in the access control information according to a prescribed rule to create search information to be used in searching the access control settings, and adding the created search information to the combined access control information.

5. The computer-readable, non-transitory medium according to claim 4, wherein the converting calculates a hash value calculated from the information of the prescribed item set in the access control information and provides the calculated hash value as the search information.

6. The computer-readable, non-transitory medium according to claim 1, wherein:
   the inconsistency measure policy to be used when the inconsistency is detected specifies a priority condition prescribing what access control setting is prioritized out of the two access control settings detected to be inconsistent; and
   the correcting keeps one access control setting and deletes the other access control setting, under the priority condition of the inconsistency measure policy.

7. The computer-readable, non-transitory medium according to claim 6, wherein:
   the inconsistency measure policy includes an operation disabling policy that prioritizes disabling an operation to the resources and an operation enabling policy that prioritizes allowing the operation to the resources; and
   the correcting deletes the other access control setting that allows the operation to the specified resource when the operation disabling policy is set as the inconsistency measure policy, and deletes the other access control setting that does not allow the operation to the specified resource when the operation enabling policy is set as the inconsistency measure policy.

8. The computer-readable, non-transitory medium according to claim 6, wherein:
the inconsistency measure policy includes an order-of-priority policy that follows an order of priority set to the each unit of processing for which the access control settings are set; and
when the order-of-priority policy is set as the inconsistency measure policy, the correcting detects units of processing for which the inconsistent access control settings are set, from the combined access control information, and deletes the other side's access control setting for a unit of processing having a low priority based on the order of priority set to the detected units of processing.

9. The computer-readable, non-transitory medium according to claim 6, wherein:
the inconsistency measure policy includes a manual setting policy that allows a user to manually resolve the inconsistency; and
when the manual setting policy is set as the inconsistency measure policy, the correcting notifies the user of existence of the inconsistent access control settings, and prioritizes the one side's access control setting according to a command from the user.

10. The computer-readable, non-transitory medium according to claim 1, wherein the correcting determines the inconsistency if the two access control settings specifying the identical subject are identified as identical in type of operation and further as defining different operation conditions on access permission and access denial to the parent and child resources.

11. The computer-readable, non-transitory medium according to claim 1, wherein the correcting determines that access control settings are duplicate if the two access control settings specifying the identical subject are identified as identical in type of operation and further as defining same operation conditions on access permission or access denial to the parent and child resources, and keeps one access control setting and deletes another access control setting.

12. The computer-readable, non-transitory medium according to claim 1, wherein the collecting collects the access control information and the resource information from transmitters each of which is provided for the memory unit arranged in the each unit of processing and is operable to autonomously transmit the access control information and the resource information stored in the each memory unit.

13. The computer-readable, non-transitory medium according to claim 12, wherein the transmitters transmit the access control information and the resource information when the access control information or the resource information stored in the memory unit is updated.

14. The computer-readable, non-transitory medium according to claim 1, wherein the procedure further comprises filtering an access request to a resource by determining based on the filtering master information whether to permit or deny the access request, when the access request to the resource is made while the each unit of processing executes processing.

15. The computer-readable, non-transitory medium according to claim 14, wherein:
the procedure further comprises counting references made by the filtering with respect to each of the access control settings composing the filtering master information, and registering access control settings having high frequencies in a cache, and
the filtering first searches the access control settings stored in the cache.

16. An access control method for performing access control to resources, the access control method comprising:
collecting access control information and resource information on the resources, which are set for each unit of processing that executes prescribed processing and are stored in a memory unit of the each unit of processing;
storing the access control information and the resource information in an access control information memory;
combining the access control information stored in the access control information memory to create combined access control information including a plurality of access control settings;
examining the resource information stored in the access control information memory to detect inclusion relations between the resources, and creating resource inclusion relation information describing the detected inclusion relations which indicate a parent resource that includes a child resource;
analyzing the combined access control information to detect inconsistency between two access control settings specifying an identical subject, one further specifying the parent resource and the other further specifying the child resource included in the parent resource, based on the detected inclusion relations described in the inclusion relation information;
correcting, if inconsistency is detected, the inconsistent access control settings in accordance with an inconsistency measure policy describing measures against the inconsistency to make the combined access control information consistent; and
storing the consistent combined access control information in a filtering master information memory as filtering master information.

17. An access control system for performing access control to resources, comprising:
an administration apparatus including:
an access control information memory unit to store access control information defining access rights of subjects to the resources and resource information on the resources,
a filtering master information memory unit to store filtering master information created from the access control information,
a collector to collect and store the access control information and the resource information in the access control information memory unit, the access control information and the resource information being set for each unit of processing executing prescribed processing and stored in a memory unit of the each unit of processing,
a combiner to combine the access control information stored in the access control information memory unit to create combined access control information including a plurality of access control settings, examine the resource information stored in the access control information memory to detect inclusion relations between the resources, and create resource inclusion relation information describing the detected inclusion relations which indicate a parent resource that includes a child resource, and
a consistency adjuster to analyze the combined access control information to detect inconsistency between two access control settings specifying an identical subject, one further specifying the parent resource and the other further specifying the child resource included in the parent resource, based on the detected inclusion relations described in the inclusion relation information, and if inconsistency is detected, correct the consistent access control settings in accordance with an inconsistency measure policy describing measures against the inconsistency to make the combined access control information consistent, and store the consistent combined access control information in the filtering master information memory as filtering master information; and an information processor including:

a transmitter to read the access control information and the resource information stored in each unit of processing and transmit the access control information and the resource information to the collector, a filtering master information memory unit to store the filtering master information, and an access filtering unit to determine based on the filtering master information whether to permit or deny an access request to a resource when the access request to the resource is made from the each unit of processing.

18. The computer-readable, non-transitory medium according to claim 1, wherein:

the combined access control information includes a first access control setting to be applied to a first resource, and a second access control setting to be applied to a second resource, and the analyzing detects inconsistency in the first and second access control settings when the inclusion relation information indicates that the first resource is a parent resource that includes the second resource as a child resource thereof, and when the first and second access control settings share a common subject and a common operation on the first and second resources, and when the first and second access control settings have different settings of access permission.

* * * * *